Aug. 4, 1959     A. P. DOUGLAS ET AL     2,897,687
PEDAL STRUCTURE
Filed July 22, 1957

*INVENTOR.*
ALVIN P. DOUGLAS
GILBERT B. HAHN
BY Gobrick & Gobrick

ATTORNEYS

2,897,687
PEDAL STRUCTURE

Alvin P. Douglas, Cleveland Heights, and Gilbert B. Hahn, Lyndhurst, Ohio, assignors to The Murray Ohio Manufacturing Company, Cleveland, Ohio, a corporation of Ohio Application July 22, 1957, Serial No. 673,442

2 Claims. (Cl. 74—594.4)

The present invention is concerned generally with pedals such as those commonly used in bicycles, velocipedes, pedal driven juvenile vehicles and like environments; and more particularly to improvements in the structure of such pedals and the method of manufacture of the same.

In bicycles, tricycles and juvenile vehicles of the pedal driven type, particularly in vehicles of lighter construction for children's use, it is desirable that pedals be provided including anti-slip tread elements which pedals are of relatively rugged but simple low cost structure; in other words that the pedal structure be such as is adapted to production with the desired characteristics of ruggedness by simple low cost manufacturing methods.

In pedals of this type—intended to be rotatably supported on a crank arm stud shaft—prior practice has involved the use of a pair of end plates between which extends a central journal tube and also a pair of tread block supporting spacer rods near opposite ends of the end plates. The tread carrying spacer rods and central journal tube have assumed various forms. For example the spacers have been formed of round stock threaded and shouldered at each end to pass through tread blocks and corresponding end plate apertures and secured thereto by nuts holding the plates against the rod shoulders; or end-shouldered rods in like disposition have been peened at opposite ends down to the end plates. In other cases rods in the form of long rivets passed through the end plates and intervening tread blocks and then headed at the rivet end have served as tread supports. Likewise various forms of journal tubes or sleeves, and means of connecting the same to the end plates have been used.

Generally where a pedal of sufficient ruggedness or rigidity resulted by prior practice, the production costs have been relatively high. In the case of pedals of acceptable cost for the intended uses the structure has not been sufficiently rugged or rigid, and would tend to twist out of shape, usually in consequence of relative rotational or angular displacement of the end plates, a condition tending to progressive deterioration of the pedal structure.

By the present invention there is provided a simple pedal structure, the elements of which are readily formed from sheet metal except for tread blocks, and readily assembled into final structure by well known sheet metal working operations. This structure, as hereinafter detailed, has the advantage of achieving the desirable objects of simplicity of structure as a whole and of individual elements; of adaptability of the required metal elements to production by known mass production sheet metal forming methods; and further of providing a pedal for use in the intended field of application which is sturdy, rigid and of relatively low cost. Other objects and advantages of the invention will appear from the following description and the drawings wherein:

Figures 1, 2:
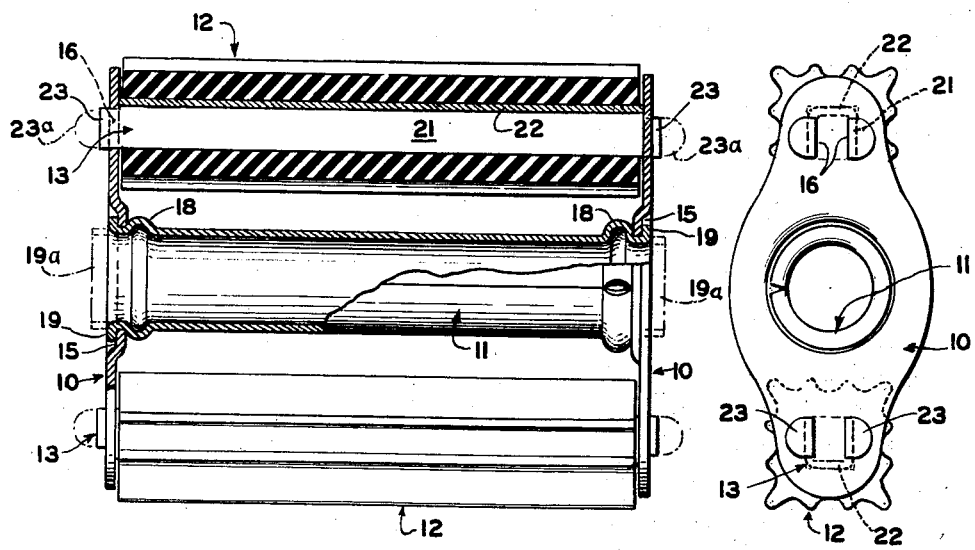
Fig. 1 is a plan view of a pedal embodying the present invention with certain parts broken away or in irregularly taken sections.
Fig. 2 is an end view of the pedal.
Figure 3:
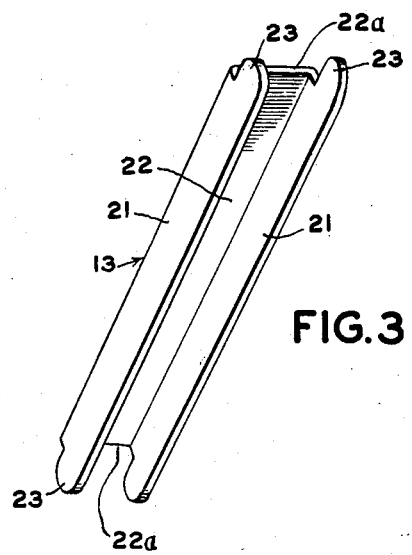
Fig. 3 is a detail view of a tread block supporting spacer element.

From the drawing it is seen that the pedal is comprised of a pair of like end plates 10 centrally apertured to receive therethrough the ends of a sleeve 11, a pair of pedal tread blocks extending between the end plates in parallel relation to the axis of the sleeve 11, and a pair of tread block supporting spacers 13 extending through a lengthwise bore in respective blocks and secured at opposite ends to plates 10.

The outline shape of an end plate 10 may be seen in Fig. 2 in a preferred form, and in accordance with common practice such plate is centrally enlarged, narrowed toward opposite ends, and of generally curved shape to avoid sharp corners. A round central area 15 is offset from the major plane of the end plate to form in the assembled pedal an outwardly facing shallow depression or recess, which is centrally apertured; while in each end portion of the plate there is provided a pair of spaced parallel slot-like apertures 16. The end plates 10 obviously may be readily formed by such low cost operations as progressive die methods blanking out and piercing the end plates from continuous strip stock.

The spacer sleeve 11 has at each end a shoulder formation 18 supporting inwardly and spacing the central areas of the end plates, while the extreme outer end portions 19 of the tube are flanged outwardly into the recessed areas 15 to secure the respective end plates against the shoulders 18. The spacer tube or sleeve 11 again is readily formed from sheet metal by blanking out a rectangular piece and forming parallel like grooves displaced toward the same side of the sheet blank and thereafter forming the blank about a mandrel into tubular form, the metal displaced at the groove areas forming the circumferential shoulders spaced inward from the ends of the resulting tube.

The tread blocks 12 may be of any desired cross sectional configuration and formed from natural or synthetic rubber or synthetic plastics. However the elongated block is here shown with parallel end faces. A central longitudinal opening of non-circular and preferably square, cross section is formed in each block for receiving a corresponding spacer 13 to provide a preferable non-rotational mounting of the blocks with respect to the rest of the structure. The length of the tread blocks is slightly shorter than the desired final spacing between the end plates for purposes to be explained.

The identical spacers 13 are here shown as elongated square channel-shaped or flat bottomed U-shaped elements with parallel legs 21 joined by the yoke portion 22, corresponding in size and shape to the cross section of the tread block openings. The length of a spacer, considered to be the distance between the ends 22a of the yoke portion 22, is longer than the tread blocks by say 1/32 of an inch. At each end of the spacers there is provided on the respective legs 21 endwise projecting tabs 23 extending through the correspondingly spaced parallel slot apertures 16 of the end plates, and clinched, flanged outwardly or bent over sideways upon the end plates to hold the same securely against the end surfaces or shoulders 22a provided by the yoke portions 22 in spaced relation. The end clearance provided by the spacer and tread block length difference permits firm clinching of the tabs on the end plates without possibility of interference by endwise compression of the tread block. Here again, the spacers may be formed by mass production sheet metal blanking and forming operations by blanking out a flat piece of generally rectangular shape with endwise projecting portions for tabs 23 and thereafter forming the blank to the desired cross sectional channel or U-shape with straight endwise projecting tabs. For the intended field of application of this pedal structure 18 ga. S.A.E. 1010 steel is a suitable material for sheet metal fabrication of the end plates, spacer and sleeve as described.

In assembling of the final pedal structure obviously the procedure may be followed of inserting the spacers in their respective tread blocks and then inserting the tabs of a pair of tread block spacer sub-assemblies through the apertures in a corresponding end plate 10 as at 23a; inserting the straight end portion 19 of a sleeve 11 through the central aperture of the same end plate as at 19a; applying the second end plate to the opposite ends of the sleeve and spacers with straight end 19a and tabs 23a projecting therethrough; and finally clinching the respective tabs 23, and flanging the end portions 19 into the recesses 15 from initial straight positions shown in dashed outline to the final positions indicated in Figs. 1 and 2. In the final structure by whatever mode of assembly used, the end plates are firmly held against the shoulder formations provided at the central areas by the circumferential ribs 18 of the sleeve and against the flat end areas previously described at the ends of the spacers 13.

The disclosed structure moreover has been found to be particularly adapted to rapid semi-automatic or even automatic assembly operations with relatively inexpensive apparatus.

We claim:

1. A pedal for children's bicycles, tricycles or juvenile pedal-driven vehicles comprising: a pair of like spaced parallel end plates each having an outwardly open centrally formed depression with a round central aperture and opposite end portions provided with like pairs of spaced slot-like apertures; a tubular journal sleeve with end portions extending through the central apertures of respective end plates, said sleeve having spaced inwardly from each end a circumferential shoulder formation engaging the inner side of a respective end plate and also having the end portion flanged outwardly over the depressed adjacent region of the end plate to secure the same against the shoulder; a pair of tread blocks each having a longitudinal opening therethrough; and a pair of elongated sheet metal spacer elements each extending through a corresponding tread block for supporting the same between said end plates; each said element having at each end a pair of spaced tabs projecting through a said pair of slot-like apertures of an end plate and externally clinched thereover and an adjacent end edge as an abutment shoulder engaging the inner side of the plate; whereby the end plates, sleeve and spacers are rigidly secured in spaced relation.

2. A velocipede pedal structure comprising: spaced apart end plates having central openings, a journal sleeve having a shoulder formation adjacent each end thereof and end portions extending from the shoulder formations through the central openings of the plates and beaded against the outer surfaces of the plates to secure the plates to the sleeve, each said plate having pairs of parallel slots formed therein and said pairs equi-spaced from the journal sleeve, a pair of pedal tread blocks each having a longitudinal opening of rectangular cross section therethrough and channel shaped spacer elements of corresponding rectangular cross sectional form for non-rotatably mounting respective pedal tread blocks thereon, said spacer elements being shaped with the end portions of the legs of the channel forming bendable nibs extending through said plate slots and the base of the channel forming shoulders abutting the inner faces of the plates.

References Cited in the file of this patent

UNITED STATES PATENTS

| | | |
|---|---|---|
| 606,046 | Chillingworth | June 21, 1898 |
| 1,474,473 | Herold | Nov. 20, 1923 |
| 1,507,206 | Sanders | Sept. 2, 1924 |
| 2,084,373 | Anderson | June 22, 1937 |
| 2,542,548 | Matthias et al. | Feb. 20, 1951 |
| 2,567,785 | Rieger | Sept. 11, 1951 |

FOREIGN PATENTS

| | | |
|---|---|---|
| 143,438 | Australia | Sept. 17, 1951 |
| 858,940 | Germany | Dec. 11, 1952 |